May 17, 1927.
W. A. HUPPRICH
BRAKE
Filed June 1, 1925
1,629,272
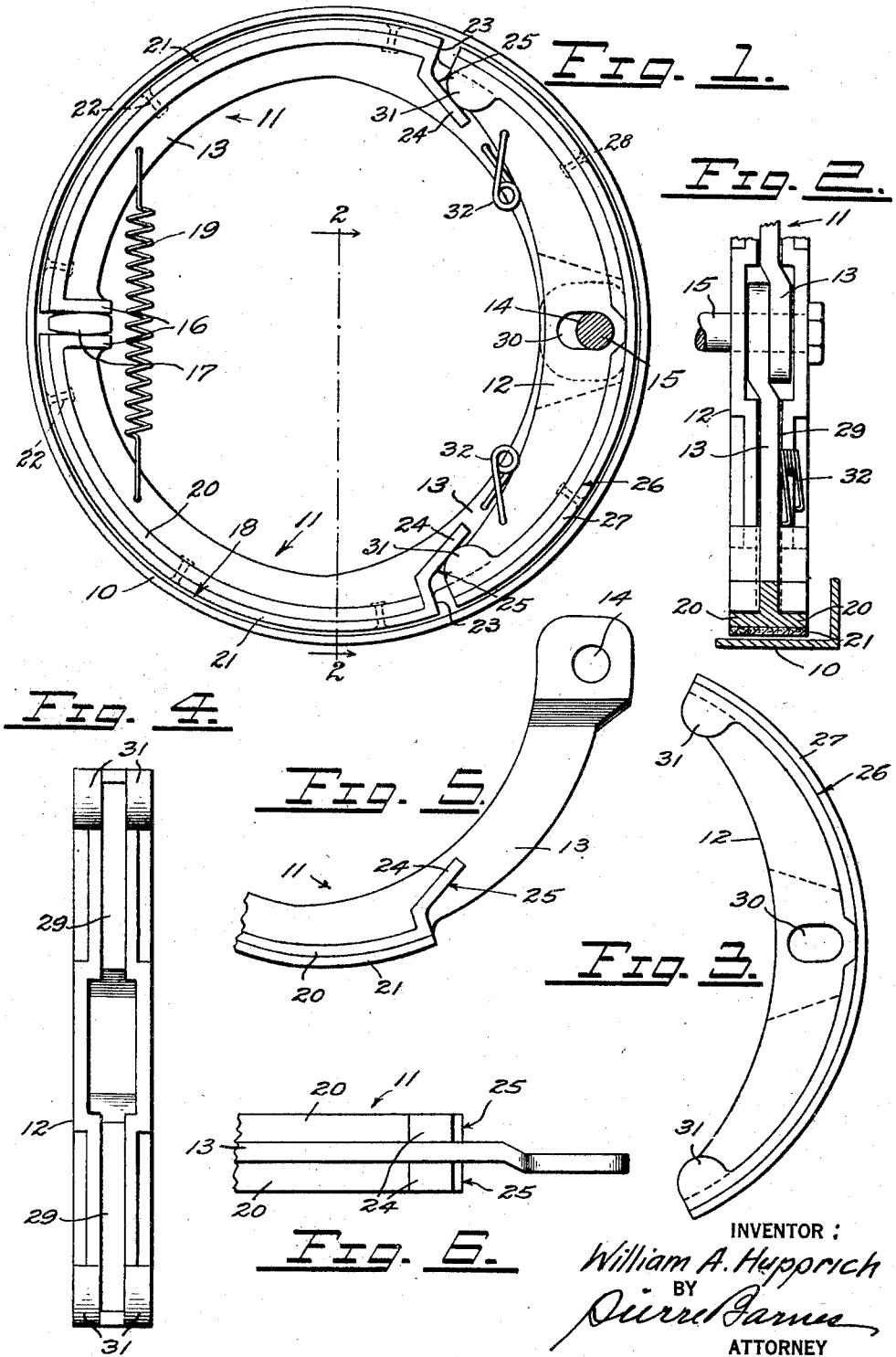
INVENTOR:
William A. Hupprich
BY
ATTORNEY Patented May 17, 1927.

1,629,272

UNITED STATES PATENT OFFICE.

WILLIAM A. HUPPRICH, OF SEATTLE, WASHINGTON.

BRAKE.

Application filed June 1, 1925. Serial No. 33,962.

This invention relates to internal brakes such as used, for example, in automobile practice.

The object of the invention, generally, is the provision of strong and durable brake devices of this character which are capable of being applied to afford a maximum braking power with a minimum wear to the brake liner, and which devices may be quickly disengaged from the brake drum.

More specific objects and advantages of the invention will appear in the following description.

The invention consists in certain novel features of construction, and in the arrangement and combinations thereof as will be hereinafter described and claimed.

In the accompanying drawing,—

Figure 1 is an end elevation of a brake drum containing brake devices embodying my improvements. Fig. 2 is a sectional view on line 2—2 of Fig. 1. Fig. 3 is a front elevation of the brake shoe shown detached. Fig. 4 is a side elevation of Fig. 3. Fig. 5 is a fragmentary side elevation of one of the brake members which control the operation of the brake shoe. Fig. 6 is a plan view of Fig. 5.

In said drawing, the reference numeral 10 represents the peripheral wall of a brake drum which is rigidly secured to one of the wheels of an automobile, said drum being of known or suitable construction.

According to the present invention, I employ within said drum two twin braking members 11 and a third braking member 12, hereinafter designated as the shoe.

Each of the braking members 11 is of an arcuate shape having a web element 13 of a length substantially equal to one-half the circumference of a circle. Near one of its ends the web 13 is provided with an aperture 14 (Fig. 5) for pivotally connecting such member to a pin 15 which is rigid with the housing for the axle of said wheel, said pin being located in proximity to one side of the drum.

At its other end each member 11 is provided with a flange 16 which serves as a bearing surface with respect to a cam 17 provided upon an operating stem (not shown) whereby the cam is rotated to relatively expand the braking members 11 into engaged relation with the inner surface 18 of the drum wall 10.

19 represents a contractile spring connected to the companion members 11 for disengaging the same from the drum when the cam 17 is rotated into the inoperative position in which it is represented in Fig. 1. The braking area of each member 11, however, is provided for but a portion of its length—as two-thirds, for example—from the end flanges 16, such braking area being afforded by means of flanges 20 extending laterally from the respective web 13 at its convex side.

21 represents a lining of asbestos or other suitable material secured, as by means of rivets 22, to the flanges 20 over their entire lengths.

At each side of the web 13 of a member 11 and in proximity of the flange ends 23 most remote from the flanges 16 is a bracket element 24 which is arranged substantially as shown in Figs. 1 and 3 to afford shoulders 25, said shoulders being located in spaced relation with respect to the outer convex edge of the member.

The shoe 12 above referred to is of a substantially crescent shape, see Fig. 3 having an outer surface 26, corresponding to a circular arc, to which is secured a liner 27 as by means of rivets 28. The length of the member 12 is slightly less than the distance between the flange ends 23 of the twin braking members 11.

The shoe 12 is slotted longitudinally as at 29 (Figs. 2 and 4) to accommodate the webs 13 of the other braking members 11. Centrally of its length the shoe 12 is provided with a slot 30 to receive the pin 15, the slot 30 being arranged to permit movement to the shoe radially of the brake axis to and from its engaged relation with the drum.

The drum engaging movement of the shoe is effected by the expanding movements of the braking members 11 through the medium of their shoulders 25 acting against protuberances 31 provided at the ends of the shoe.

32 represent sear springs having their arms engaged in apertures of the braking members 11 and the shoe 12 to cause said shoe protuberances to be held in juxtaposition with the shoulders 25 thereby permitting said sear springs to retract the shoe from its engagement with the drum when the members 11 recede.

From the foregoing it is apparent that the distending of the braking members 11 by means of the operating cam 17 influences the shoe to engage the drum; but when the cam is turned into its inoperative position, the springs 19 and 32 cause both the braking members 11 and the shoe 12 to be disengaged from the drum.

While I have illustrated and described the embodiment of the invention now preferred by me, I do not wish to confine myself thereto except as limited by the following claims.

What I claim, is,—

1. In a brake, the combination of a drum, a fixed pin, a pair of brake members pivotally connected at one end of each to the pin, said members having intermediate their lengths inclined shoulder elements, a brake shoe slidable on the brake members and having its ends in engaged relation with the respective shoulder elements, springs tending to retract said shoe and members from the drum, and a cam for actuating the brake members to effect the setting of the same and the shoe.

2. In a brake, two brake members, a fixed pivot for one end of each of said members, a brake shoe slidable upon said brake members and guided by said pivot for movement radially of the brake axis, said shoe being recessed to accommodate a portion of each of said members, means provided upon the shoe and engageable with the respective members for transmitting setting movement therefrom to the shoe, means for effecting setting movement to both of the members, and resilient means for retracting the brake members and the shoe from their braking positions.

3. The combination with a brake drum, a pin at one side thereof, and an operating cam at the diametrically opposite side, of twin brake members pivotally connected at one end of each to said pin, a spring acting to retain the other ends of the members in engaged relation with said cam, and a brake shoe adapted to be actuated by the setting of said members, said shoe being movable relative to and guided by said pin for movement radially of the drum axis.

4. The combination with a brake drum, a pin at one side thereof, and an operating cam at the diametrically opposite side, of twin brake members pivotally connected at one end of each to said pin, a spring acting to retain the other ends of the members in engaged relation with said cam, a brake shoe adapted to be actuated by the setting of said members, said shoe being guided by said pin for movement radially of the drum axis, and spring devices cooperating with the aforesaid spring for retracting said members and the shoe with respect to the drum.

Signed at Seattle, Washington, this 12th day of May, 1925.

WILLIAM A. HUPPRICH.